United States Patent
Patel

(10) Patent No.: US 6,317,849 B1
(45) Date of Patent: Nov. 13, 2001

(54) METHOD AND APPARATUS FOR CONTROLLING AVAILABLE CAPABILITIES OF A DEVICE

(75) Inventor: Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/302,273

(22) Filed: Apr. 28, 1999

(51) Int. Cl.⁷ .................................................. H04L 9/00
(52) U.S. Cl. ............................................ 714/194; 713/200
(58) Field of Search ............................... 713/200, 194, 713/100, 1

(56) References Cited

U.S. PATENT DOCUMENTS

| | | |
|---|---|---|
| 5,604,880 | 2/1997 | Dipert . |
| 5,704,039 * | 12/1997 | Yishay et al. ................ 713/200 |
| 5,721,703 | 2/1998 | Habersetzer et al. . |
| 5,835,596 | 11/1998 | Klemba et al. . |
| 6,009,012 | 12/1999 | Sibigtroth et al. . |

FOREIGN PATENT DOCUMENTS

| | | |
|---|---|---|
| 0708446A3 | 9/1995 | (EP) . |
| 0899648A2 | 8/1998 | (EP) . |

* cited by examiner

Primary Examiner—Ly V. Hua
(74) Attorney, Agent, or Firm—Steven P. Skabrat

(57) ABSTRACT

An apparatus within a device, such as an integrated circuit, for controlling available capabilities of the device. The apparatus includes an EEPROM storing a configuration control word having at least one bit, a configuration control mask having at least one bit, and logic to select a first operating mode of the device when the configuration control word does not match the configuration control mask and to select a second operating mode of the device when the configuration control word matches the configuration control mask. The first operating mode may indicate full capabilities of the device and the second operating mode may indicate a set of reduced capabilities of the device. Additional logic in the device implements a "write once" feature for irrevocably setting the configuration control word to match the configuration control mask, thereby permanently selecting the second operating mode (e.g., reduced capabilities).

30 Claims, 2 Drawing Sheets

METHOD AND APPARATUS FOR CONTROLLING AVAILABLE CAPABILITIES OF A DEVICE

BACKGROUND

1. Field

The present invention relates generally to controlling system capabilities and, more specifically, to using a "write once" method for securely and irrevocably changing selected capabilities of a device.

2. Description

Manufacturers of some electronic equipment, such as integrated circuits, microprocessors, network adapters, and computer systems, for example, often produce products with varying levels of capabilities or functions. Such disparate product versions may be produced as a result of marketing or legal concerns. For example, U.S. export law prohibits the exportation of certain technology that surpasses a defined level of processing performance or cryptographic security. In order to further the manufacturer's goals or to comply with the law, manufacturers use various techniques to enable certain capabilities for some versions of a product, but disable certain capabilities for other versions of the product. When the product may be manipulated or operated by software, the manufacturer may in some cases be able to enable or disable product capabilities via software controls or software configuration version updates. However, when the product by its nature may be manipulated only by hardware controls, version control becomes more complicated and difficult to manage.

In the example of cryptographic features of computer hardware devices, one requirement for developing exportable and non-exportable products that contain cryptographic capabilities is that the exportable product must not have certain capabilities that the non-exportable product does. For example, non-exportable products may implement Data Encryption Standard (DES) encryption using key lengths of 40, 56, 112, or 168 bits. However, exportable products may only implement key lengths of 40 bits for encryption. Given this restriction, a manufacturer might want to produce a product that can be configured to operate in either an exportable or a non-exportable mode. Furthermore, once the product is exported, it should not be possible to enable the non-exportable capabilities of the exported product. In this example, the product once exported should not be able to be configured to use key lengths of 56, 112, or 168 bits.

In many instances, to control the cost of design and manufacturing efforts for such products, the manufacturer should be able to delay configuration of the product to exportable mode or other reduced capability until the very latest stages of the manufacturing process. Therefore, it should be possible to change the product to an exportable mode or other reduced capability at minimum cost as late as possible, but while still making it extremely difficult or impossible for another party to enable the disabled capabilities at a later point in time.

Presently, several methods are used to handle this configuration problem. A basic approach is to provide two separate designs of the product, one for export or reduced capability, and one for domestic use or full capability. However, this means that an a priori knowledge of product demand for each design is required in order to control the product inventory by the manufacturer. Also, if the product fits into a larger system, original equipment manufacturers (OEMs) that use the product must also know the demand for their systems in the U.S. and abroad. Additionally, the manufacturer has the overhead and configuration management issues of supporting two different versions of the product. Clearly, this approach has disadvantages. In addition, due to the global manufacturing process, often the non-exportable products are exported, and then brought back into the country of origin. In this case, managing multiple inventories across countries becomes even more complicated.

In another approach, the manufacturer can delay the decision on configuring the product by incorporating an electronic fuse in the product. An electronic fuse may be, for example, a wire in the product that can be broken by applying a high voltage or high current. Internally, the product may check the status of current flow through the wire to determine the valid operational capabilities of the product. Thus, with the use of specialized tools, the electronic fuse may be blown to create an exportable product. However, this approach still presents problems for an OEM who wants to include the product in a system design and still delay the decision on whether to export the system or sell the system domestically. With the increasing globalization of system manufacturing sites, this approach in many cases is unacceptable. Additionally, the electronic fuses are fairly expensive to implement in silicon.

In yet another approach, one or more pins of the hardware product may be selectively bonded such that when the pin is bonded, a logic value (e.g., a 0 or a 1) can be applied to enable the product to be used in a full capability mode. However, if the pin is not bonded, the predetermined value cannot be applied to it, and therefore, it can be operated in exportable or reduced capability mode only. Again, this approach requires action on the part of the manufacturer fairly early in the manufacturing process to ensure correct bonding attributes.

Therefore, there is a need for a configuration technique to overcome these and other disadvantages of the prior art.

SUMMARY

An embodiment of the present invention is an apparatus within a device for controlling available capabilities of the device. The apparatus includes an EEPROM storing a control word having at least one bit, a mask having at least one bit, and logic coupled to the EEPROM and the mask to select a first operating mode of the device when the control word does not match the mask and to select a second operating mode of the device when the control word matches the mask.

BRIEF DESCRIPTION OF THE DRAWINGS

The features and advantages of the present invention will become apparent from the following detailed description of the present invention in which.

DETAILED DESCRIPTION

An embodiment of the present invention comprises a method and apparatus for selectively and permanently disabling capabilities or functions of a hardware product such as an integrated circuit.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
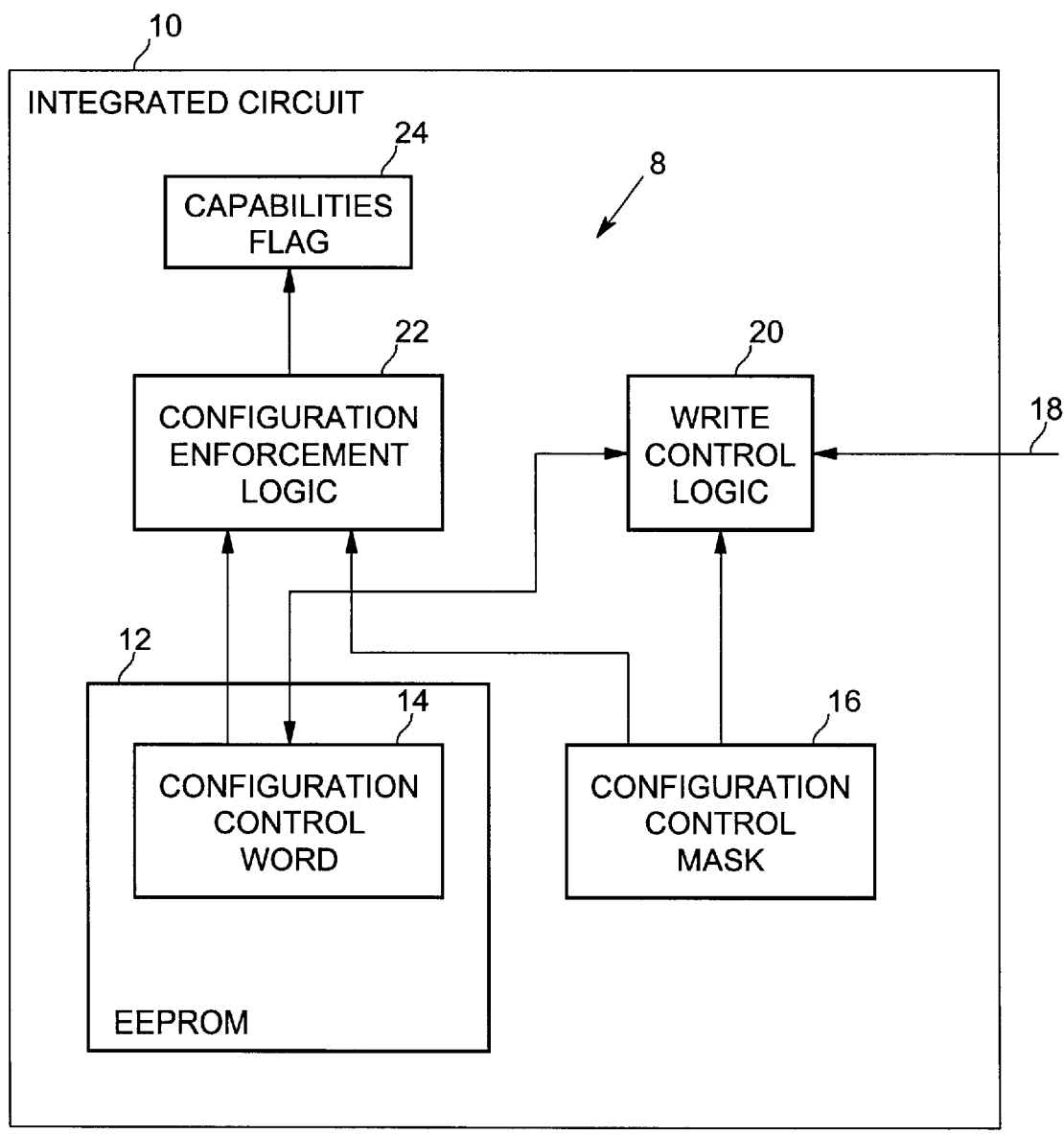
FIG. 1 is a diagram of a configuration control apparatus according to an embodiment of the present invention.

FIG. 1 is a diagram of a configuration control apparatus 8 according to an embodiment of the present invention. A hardware product or device, such as integrated circuit 10, for example, includes an electrically erasable, programmable read only memory (EEPROM) 12. Recent advances in manufacturing capabilities have made it possible to include EEPROMs within integrated circuits (ICs). At least a portion of the EEPROM may be reserved for storing configuration information for the device. In one embodiment, the configuration information comprises a 32 bit word, although the invention is not limited in scope in this respect. In alternate embodiments, any number of bits may be used to store the configuration information, including as little as one bit. The reserved space in one embodiment may be called a configuration control word (CCW) 14. The CCW stores a value indicating a current configuration key or flag for the device. A mask value, called a configuration control mask (CCM) 16 in one embodiment, may be stored in a memory (not shown) or otherwise represented within the device, such as IC 10, as a "hard-coded" binary value. The CCM may be represented in the same number of bits as the CCW. In some embodiments, the CCM may be stored in EEPROM 12.

In one embodiment, when the value of CCW 14 in EEPROM 12 matches CCM 16, the device may only be operated in a first operating mode, which may indicate a reduced capability or exportable mode. When the CCW does not match the CCM, then the device may be operated in a second operating mode, which may indicate full capabilities or non-exportable mode. In another embodiment, these relationships may be changed such that when the CCW matches the CCM, the device may be operated in the second operating mode, and when the CCW does not match the CCM, the device may be operated in the first operating mode. The value of the CCW may be changed by signaling a new value(s) on write line(s) 18. In one embodiment, there may be 32 write lines, the same number of write lines as there are bits in the CCW and CCM, although the invention is not limited in scope in this respect. In other embodiments, one or more lines may be used, as long as the number of lines matches the number of bits in the CCW and the CCM. Write control logic (WCL) 20 controls whether the value of the CCW can be electronically programmed to a different value. WCL reads the CCW's value out of EEPROM 12 and compares it to the CCM's value. The essence of write control logic 20 in one embodiment is that when the value stored in the CCW matches the CCM, the CCW is not allowed to be changed to a different value. However, if the value stored in the CCW does not match the CCM, the CCW may be changed to any value (including the value of the CCM). In another embodiment, these relationships may be changed such that when the value stored in the CCW does not match the CCM, the CCW is not allowed to be changed to a different value. However, if the value stored in the CCW matches the CCM, the CCW may be changed to any value (including the value of the CCM). The relation between the CCW and CCM determining the capabilities (e.g., either equals or not equals) may be a design choice.

In other embodiments, if the device requires more than two operating modes or sets of capabilities, a plurality of CCMs may be used, such that each CCM indicates a selected operating mode or capability. A given operating mode or capability may then be selected by setting the CCW to match the corresponding CCM.

Configuration enforcement logic (CEL) 22 reads the CCW's value out of EEPROM 12 and compares it to the CCM's value. Configuration enforcement logic 22 restricts operation of the device so that certain capabilities are either enabled or disabled based on the values of the CCW and CCM. For example, if the device operates in two modes, exportable and non-exportable, and if the value of the CCW matches the value of the CCM for exportable hardware, then full strength DES (e.g., 56 bit key length) or triple DES (e.g., 112 and 168 bit key length) capabilities may be disabled. However, if the value of the CCW does not match the value of the CCM, then full capabilities may be allowed. Alternatively, the opposite relation (e.g., either equals or not equals) being determined between the CCM and CCW may be used to select the operating mode. Configuration enforcement logic 22 writes values into capabilities flag 24 to indicate whether full or reduced operating capability is enabled. In other embodiments, a plurality of capabilities flags may be used, one for each CCM or capability level or operating mode. Other system logic (not shown) may then read capability flag 24 to determine the operating status and enable or disable device functions accordingly.

Figure 2:
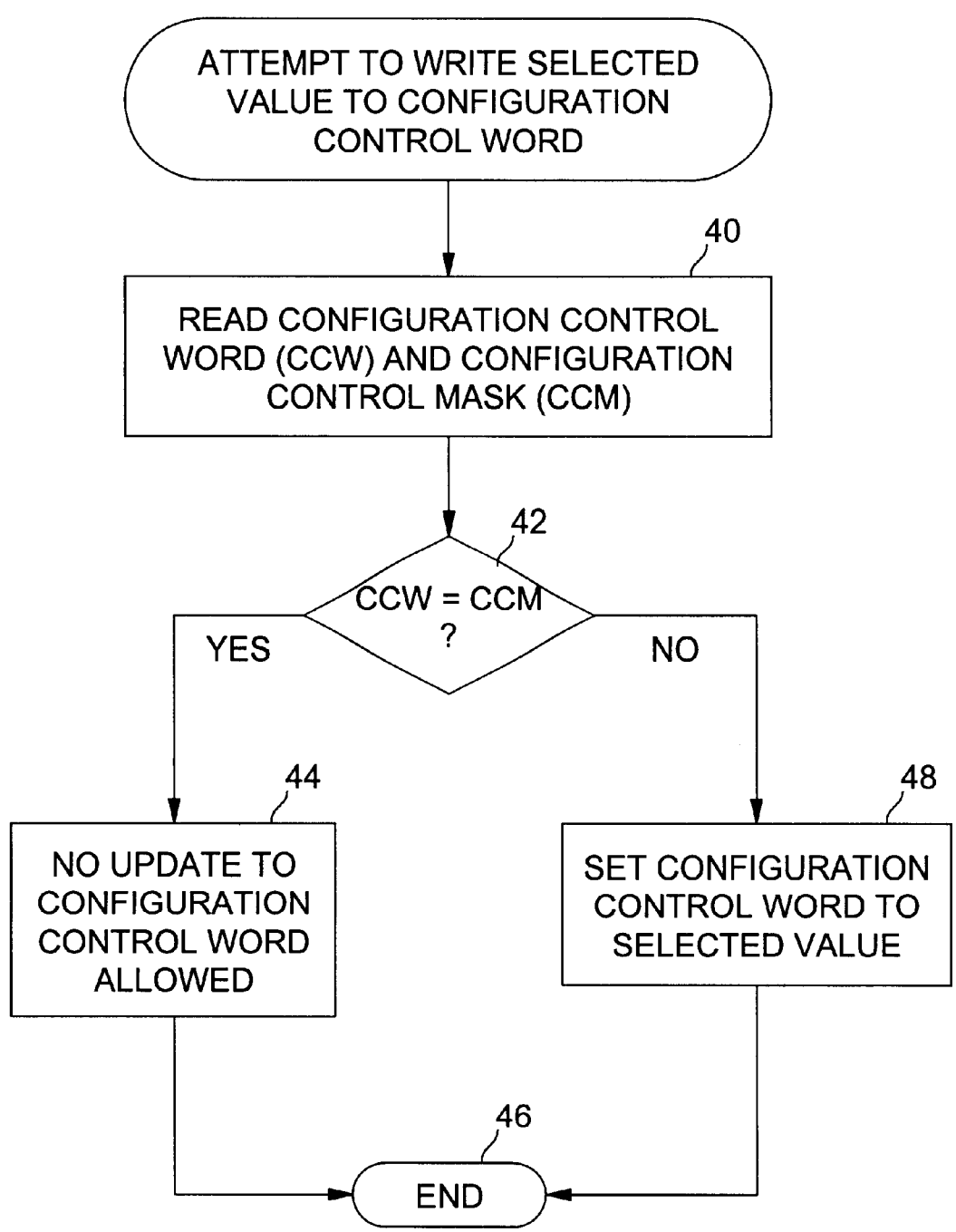
FIG. 2 is a flow diagram illustrating write control logic processing according to an embodiment of the present invention.

FIG. 2 is a flow diagram illustrating write control logic processing according to an embodiment of the present invention. When there is an attempt to write a selected value to a configuration control word (CCW) in EEPROM, the write control logic reads the CCW and the configuration control mask (CCM) at block 40. If the CCW equals the CCM at block 42, then no update to the CCW is allowed at block 44 and write control logic processing ends at block 46. If the CCW does not equal the CCM at block 42, then at block 48 the CCW may be set to the selected value input to the device via the write lines. Note that this logic implements a "write once" feature for the CCW if the CCM value is ever written to the CCW. This setting of the CCW to match the CCM is irrevocable.

The size of the CCW and the CCM may be chosen depending on the design requirements for a particular integrated circuit or device and whether the CCW will be initialized to a certain value or be left in a random state after manufacturing. If the CCW is initialized to a particular value at manufacturing time (e.g., all 0's or all 1's), then the CCW may be as small as one bit and still provide control over two operating modes or two distinct sets of capabilities. For a one bit indicator, if the CCW is always 0 at the time of manufacturing, the CCM may be set to 1. If the CCW is always 1 at the time of manufacturing, the CCM may be set to 0. However, if the bits in the CCW are random (i.e., an equal probability of being 0 or 1), then more than one bit may be used. In this case, the CCM can be any value and therefore may be selected to minimize the complexity of the write control logic and the configuration enforcement logic. If the CCW bits are 1 with probability p, the CCM may be chosen such that x bits are 1 where x=pn, and n is the number of bits in the CCM and CCW. The number of bits in the CCW can also be based on cost requirements. For example, when n=32, one out of 2  32 devices will not be non-exportable because it will initially have a CCW value the same as the CCM. However, if n=4, then one out of 2  4 chips will not be non-exportable. Based on at least market demand, the cost of EEPROM, and the cost of the added write configuration and configuration enforcement logic, design tradeoffs may be made in selecting the number of bits for the CCW and CCM.

Since embodiments of the present invention comprise a method and apparatus for controlling the available capabilities of integrated circuits or devices by programming EEPROM, it can be implemented or applied at any stage of the manufacturing process where an EEPROM can be reprogrammed. To change operating capabilities of the device, access to the write lines are needed. Therefore, if the device is included in a computer system, for example, the control can be applied even after a complete computer system has been manufactured, as long as write line access is available. The cost of programming the device is small because it does not require specialized tools or processes. Although the example shown herein discusses controlling cryptographic capabilities, embodiments of the present invention may be used to customize, limit, or control other capabilities of a device. This allows a manufacturer to produce fewer product versions that can be configured to operate with different capabilities based on price or other requirements.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. An apparatus within a device for controlling available capabilities of the device comprising:
    an EEPROM storing a control word having at least one bit;
    a mask having at least one bit; and
    first logic coupled to the EEPROM and the mask to select a first operating mode of the device when the control word does not match the mask and to select a second operating mode of the device when the control word matches the mask; and
    second logic coupled to the EEPROM and the mask to prevent resetting of the control word in the EEPROM when the control word matches the mask.

2. The apparatus of claim 1, wherein the first operating mode comprises full capabilities of the device and the second operating mode comprises reduced capabilities of the device.

3. The apparatus of claim 1, wherein the first operating mode comprises a non-exportable mode of the device and the second operating mode comprises an exportable mode of the device.

4. The apparatus of claim 1, wherein the second operating mode comprises full capabilities of the device and the first operating mode comprises reduced capabilities of the device.

5. The apparatus of claim 1, wherein the second logic allows setting of the control word to a selected value when the control word does not match the mask.

6. The apparatus of claim 1, further comprising at least one flag coupled to the first logic for indicating whether first or second operating modes of the device is enabled.

7. The apparatus of claim 1, wherein the device comprises an integrated circuit.

8. The apparatus of claim 1, further comprising at least one line coupled to the second logic to communicate a desired setting of the control word.

9. A method of controlling available capabilities of a device having a EEPROM, the device storing a mask having at least one bit comprising:
    selecting a first operating mode of the device when a control word having at least one bit, the control word being stored in the EEPROM, matches the mask;
    selecting a second operating mode of the device when the control word does not match the mask; and
    preventing resetting of the control word in the EEPROM when the control word matches the mask.

10. The method of claim 9, wherein the first operating mode comprises full capabilities of the device and the second operating mode comprises reduced capabilities of the device.

11. The method of claim 9, wherein the first operating mode comprises a non-exportable mode of the device and the second operating mode comprises an exportable mode of the device.

12. The method of claim 9, wherein the second operating mode comprises full capabilities of the device and the first operating mode comprises reduced capabilities of the device.

13. The method of claim 9, further comprising setting the control word to a selected value when the control word does not match the mask.

14. The method of claim 9, wherein the device comprises an integrated circuit.

15. The method of claim 9, further comprising setting a capabilities flag indicating an operating mode of the device based on a comparison of the control word to the mask.

16. The method of claim 9, further comprising setting the mask to a predetermined value.

17. The method of claim 9, further comprising setting the control word in the EEPROM to a value different than the value of the mask.

18. An apparatus for irrevocably selecting an exportable or non-exportable operating mode for an integrated circuit comprising:
    an EEPROM storing a control word having at least one bit;
    a control mask having at least one bit;
    write control logic coupled to the EEPROM and the control mask to allow a first operating mode of the integrated circuit when the control word does not match the control mask and to allow a second operating mode of the integrated circuit when the control word matches the control mask; and
    configuration enforcement logic coupled to the EEPROM and the control mask to prevent resetting of the control word in the EEPROM when the control word matches the control mask.

19. The apparatus of claim 18, wherein the first operating mode comprises a non-exportable operating mode and the second operating mode comprises an exportable operating mode.

20. The apparatus of claim 18, wherein the second operating mode comprises a non-exportable operating mode and the first operating mode comprises an exportable operating mode.

21. The apparatus of claim 19, wherein the second operating mode comprises cryptographic security having a key length of a first number of bits and the first operating mode comprises cryptographic security having a key length of greater than the first number of bits.

22. The apparatus of claim 18, wherein the configuration enforcement logic allows setting of the control word to a selected value when the control word does not match the control mask.

23. The apparatus of claim 18, further comprising at least one flag coupled to the write control logic for indicating whether first or second operating modes of the device are enabled.

24. The apparatus of claim 18, further comprising at least one write line coupled to the write control logic to communicate a desired setting of the control word.

25. A method of controlling operating modes of an integrated circuit having a EEPROM, the integrated circuit storing a mask having at least one bit, the operating modes including exportable cryptographic and non-exportable cryptographic modes comprising:

allowing only an exportable cryptographic operating mode for the integrated circuit when a control word having at least one bit, the control word being stored in the EEPROM, matches the mask;

allowing a non-exportable cryptographic operating mode of the integrated circuit when the control word does not match the mask; and preventing resetting of the control word in the EEPROM when the control word matches the mask.

26. The method of claim 25, further comprising setting the control word to a selected value when the control word does not match the mask.

27. The method of claim 25, further comprising setting a capabilities flag indicating a cryptographic operating mode of the integrated circuit based on a comparison of the control word to the mask.

28. The method of claim 25, further comprising setting the mask to a predetermined value during manufacturing of the integrated circuit.

29. The method of claim 25, further comprising setting the control word in the EEPROM to a value different than the value of the mask during manufacturing of the integrated circuit.

30. An apparatus for controlling a plurality of operating modes of a device comprising:

an EEPROM storing a control word having at least one bit;

a plurality of masks, each mask having at least one bit and corresponding to one of the operating modes;

first logic coupled to the EEPROM and the plurality of masks to allow a selected operating mode of the device when the control word matches a corresponding one of the plurality of masks; and second logic coupled to the EEPROM and the plurality of masks to prevent resetting of the control word in the EEPROM when the control word matches one of the masks.

* * * * *